United States Patent Office 3,379,405
Patented Apr. 23, 1968

3,379,405
VALVE
Paul J. Natho, Houston, Tex., assignor to ACF Industries, Incorporated, New York, N.Y., a corporation of New Jersey
Filed Jan. 3, 1966, Ser. No. 528,021
9 Claims. (Cl. 251—31)

This invention relates generally to improvements in gate valves having rising stem reciprocating gates for the control of fluid therethrough, and more particularly the invention is directed to a gate valve construction provided with a fail-safe hydraulic operator for controlling the opening and closing movements of the gate of the valve.

The petroleum industry, paticularly for wellhead and transmisison service, makes extensive use of through conduit gate valves, that is, gate valves having valve members, which in the open position form a portion of the bore through the valves, thereby presenting unbroken, smooth wall conduit in which there is no more pressure drop in an equal length of equal diameter pipe. With the advent of automation, it has become desirable to provide such through condiut gate valves with remotely controllable operator devices generally known as power operators within the valve industry. Since gate valves operate by reciprocatory movement, one type of operator used frequently is the hydraulic cylinder operator. The piston of the operator is attached to the stem of the valve and by applying hydraulic pressure to one side or the other side of the piston, the stem is extended or retracted. Since the valve member is attached to the stem, the reciprocating movement of the stem opens and closes the valve.

Since automated valves may be situated in remote locations, it is desirable that they be provided with fail-safe means which will automatically cause movement of the valve to a predetermined safe position should the hydraulic system operating the hydraulic cylinders fail. Depending upon the requirements, this fail-safe feature will either open or close the valve automatically in the event of failure of the hydraulic system. The present invention contemplates a novel hydraulic operator assembly for a through conduit valve wherein the hydraulic operating cylinder having a fail-safe feature is attached directly to and forms a portion of the valve itself. The fail-safe feature is accomplished generally by a compression spring which surrounds the operating cylinder and is connectively attached to a portion of the stem which extends through the top of the hydraulic cylinder. This construction maintains the overall length of the gate valve and operator at a desired minimum. Moreover, gate valves by their inherent characteristics require a considerable length of travel and in some instances require considerable forces for operation thereof. The construction of a present operator efficiently satisfies these requirements. To permit use of the assembly in adverse environments such as underwater application, for example, the entire assembly is encased by a cover or housing which provides sufficient height to accommodate the assembly in its expanded condition.

An important object of this invention is to provide a combined through conduit valve and hydraulic operator assembly having a fail-safe feature wherein the spring providing the fail-safe feature surrounds the hydraulic operator, thereby providing the necessary forces to assure positive and full movement of the valve member and yet maintaining overall height of the operator at a desired minimum.

An even further object of this invention is to provide a novel hydraulic cylinder operator assembly in which the provision is made to supply pressure to the top side of the operating piston from the base of the operator assembly.

Among the objects of this invention is contemplated the provision of a novel hydraulically controlled through conduit gate valve including means for establishing a valve stem stop and combined pressure actuated seal arrangement to prevent the leakage of fluid along the valve stem in the safe position of the valve.

It is an even further object of this invention to provide a novel hydraulically controlled gate valve including a hydraulic operator wherein the piston of the hydraulic operator is positively locked in a desirable position on the valve stem.

Other and further objects of this invention will become obvious upon an understanding of the illustrative embodiments about to be described or will be indicated in the appended claims and various advantages not referred to herein will occur to one skilled in the art upon employment of the invention in practice.

A preferred embodiment of the invention has been chosen for purpose of illustration and description and is shown in the accompanying drawings forming a part of the specification wherein.

Figure 1:
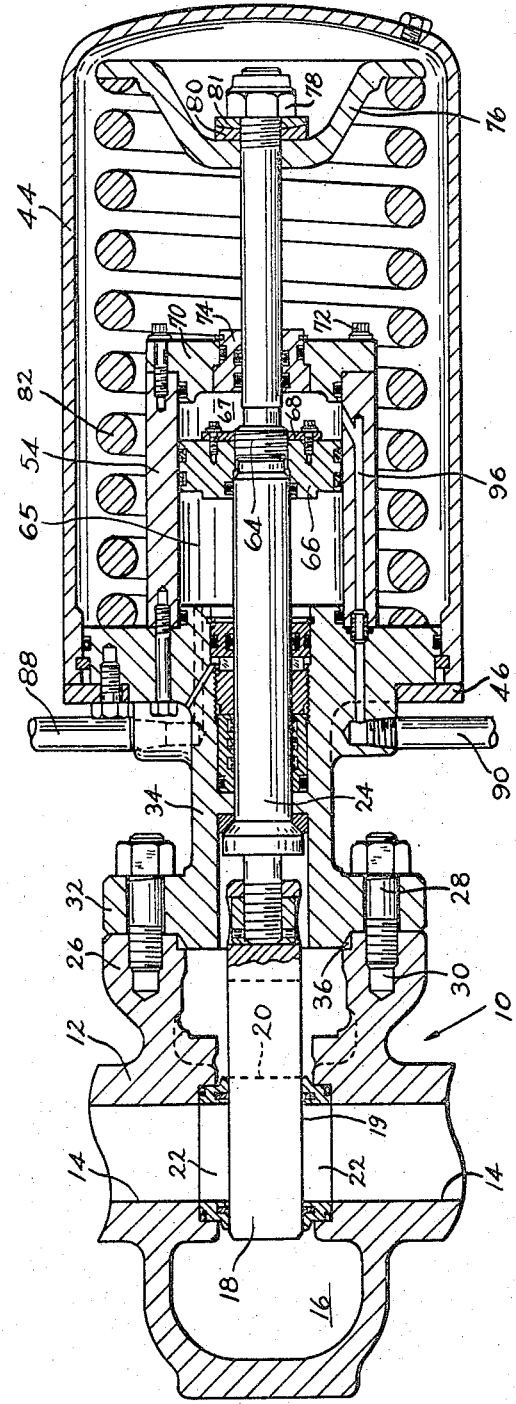
FIGURE 1 is a sectional view through a combined valve and operator constructed in accordance with this invention.

Referring to the drawings in detail for a better understanding of the invention, reference character 10 generally designates a through conduit gate valve which includes a valve body 12 having a bore 14 extending therethrough and defining inlet and outlet passages. Intersecting the bore 14 is a valve chamber 16 in which is positioned a reciprocating valve member 18. The valve member 18 has a passage 20, which in the open position of the valve is aligned with the bore 14 forming a smooth conduit for the uninterrupted flow of fluid therethrough and a solid portion 19 which, in the closed position of the valve, cooperates with a seat member 22 to block the flow of fluid through the bore 14. An operating stem 24 is attached to one extremity of the valve member 18 to provide means for moving the valve member between its open and closed positions. The valve member 18 shown in FIGURE 1 is of the parallel sealing face slab type and is illustrated in FIGURE 1 in its closed condition with the solid portion 19 of the gate in sealing engagement with the seats 22 and blocking the flow of fluid through the valve.

The valve body 12 is provided with an annular flange 26 defining an opening into the valve chamber 16. A number of threaded studs 28 are received within a series of threaded openings in the flange 26 and retain the bonnet flange portion 32 of an operator base 34 in assembly with the flange 26. An annular sealing member 36 is disposed between the bonnet flange 32 and the flange 26 of the valve body establishing a fluid tight seal therebetween. An annular operator flange 38 is formed on the operator base 34 and is provided with reduced diameter portions defining annular housing support shoulders 40 and 42.

A housing structure 44 is fitted closely about the exterior periphery of the annular flange 38 and is disposed with one extremity thereof in engagement with an annular retainer 46 retained on the flange 38 by a series of bolts 48. The housing 44 is provided with an internal groove 50 in which is positioned a snap ring 52. The snap ring 52 is in engagement with the annular shoulder 40 on the flange 38, thereby preventing movement of the housing 44 in a direction away from the retainer 46. The housing 44 is therefore positively retained on the flange 38 by the retainer member 46 and the snap ring 40. An annular sealing ring 53 is disposed within a groove 56 formed in the exterior periphery of the flange 38 and establishes a fluid tight seal between the housing 44 and the flange 38, thereby adapting the construction for underwater use.

An operator cylinder 54 is fitted in close relation about the exterior periphery of an axial flange 56 defined on the base member 34. An annular seal member 58 is disposed within an annular groove 60 formed in the axial flange 56 to establish a fluid tight seal between the cylinder 54 and the base member 34 to prevent the flow of fluid from the cylinder into the housing as the operator is pressurized. A series of bolts 62 extends through the operator flange 38 of the base 34 and retain the cylinder 54 in fixed engagement with the flange 38.

The valve operating stem 24 is provided with a threaded portion 64 intermediate its extremity. A piston 66 disposed within the cylinder 54 and dividing the cylinder into a first fluid chamber 65 and a second fluid chamber 67 is received by the threaded portion 64 of the valve stem and is maintained in a locked condition relative to the stem 24 by a locking plate 68.

A closure member 70 is retained by bolts 72 at the free extremity of the cylinder 54 and includes a packing adapter 74 having sealing structure for the maintenance of a fluid tight seal between the closure 70 and the valve stem 24.

A retainer plate 76 is connected at the free extremity of the valve stem 24 by a locking nut 78. A pair of interfitting alignment members 80 are interposed between the nut 78 and the retainer 76 to provide for proper alignment of the stem and the retainer plate to prevent the introduction of lateral forces to the stem. The members 80 and 81 are provided respectively with mating concave and convex surfaces which insure proper alignment of the retainer plate 76 relative to the stem and prevent lateral thrusts from being transmitted by the spring from the retainer plate to the stem. A compression spring member 82 is interposed between the retainer plate 76 and the operator flange 38 of the base member 34. A portion of the spring 82 surrounds the cylinder 54 of the operator so that the spring 82 may be of sufficient length to cause actuation of the fail-safe mechanism through the desired length of travel and yet maintain the operator system as a desired minimum length. The adapter plate 76, being of larger external diameter than the external diameter of the cylinder 54 allows the spring to be disposed between the cylinder and the wall of the operator housing 44.

Figure 2:
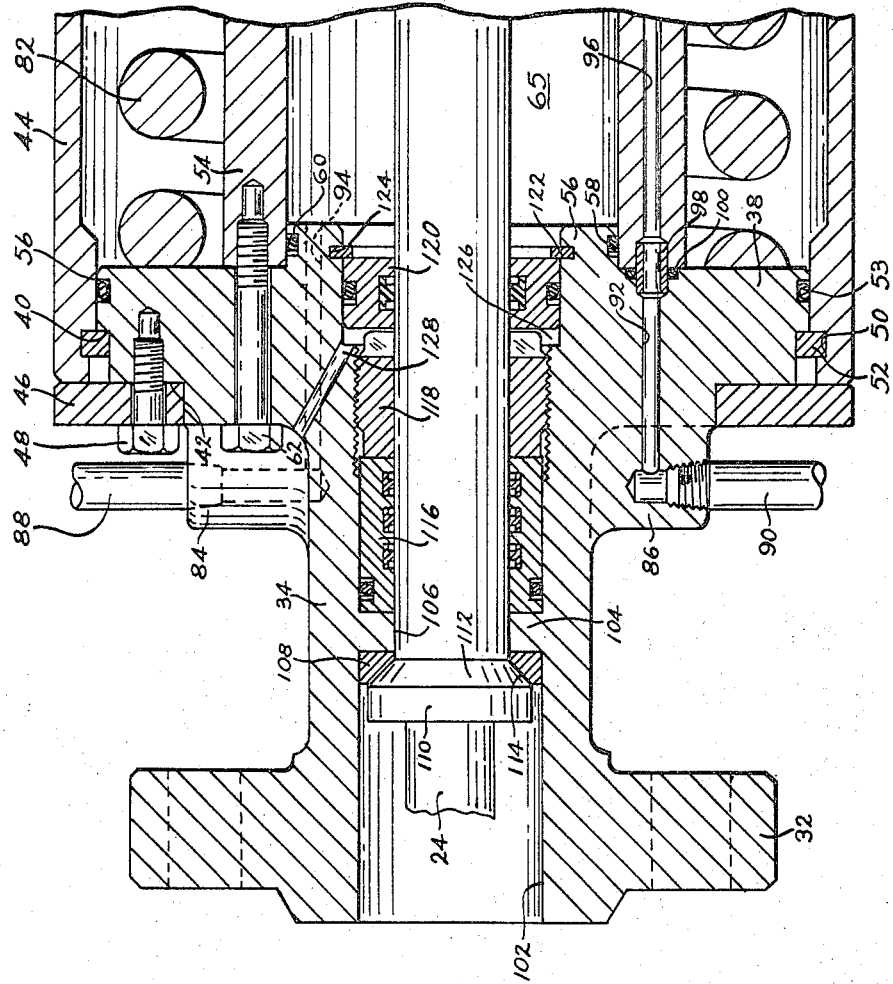
FIGURE 2 is a fragmentary sectional view of the invention of FIGURE 1 illustrating the stem seal structure in detail.

For providing the operator with pressurized fluid for the control thereof, a pair of bosses 84 and 86 are formed on the base 34 to which are connected fluid conduits 88 and 90. Fluid passages 92 and 94 are formed in the base member 34. The fluid passage 94 opens into the first fluid chamber 65 of the cylinder 54 as illustrated in FIGURE 2. The fluid passage 92 is in fluid communication with a passage 96 opening into the second fluid chamber 67 of the cylinder 54. Connection between the passages 92 and 96 is achieved by means of a tubular conduit 98 which is fitted within enlarged bores formed in the flange 38 and in the cylinder 54. A sealing member 100 disposed about the tubular conduit 98 establishes a fluid tight seal between the conduit 98, the cylinder 54 and the flange 38 and prevents fluid from flowing from the passage 92 and 96 into the first fluid chamber or outwardly into the space surrounding the cylinder 54.

The base member 34 is provided with a stem passage 102 having an internal flange 104 defining a restricted opening 106. A combination stem stop member and seal member 108 is disposed within the stem passage 102 in abutment with the internal flange 104. The valve stem 24 is provided with an enlargement 110 defining a frusto-conical surface 112 disposed for intimate engagement with the frusto-conical surface 114 on the stop member 108.

The stop member 108 is preferably formed of a soft metal such as bronze, for example, which will deform under pressure exerted by the frusto-conical surface 112 there against to establish a seal to prevent fluids within the valve chamber 16 from flowing past the internal flange or restriction 104. An inner packing cartridge 116 is disposed within the stem passage 102 and is maintained in abutment with the internal flange 104 by a packing retainer 118 threadedly received within the bore 102. The packing cartridge 116 is provided with internal and external seal structure maintaining a fluid tight seal relationship with the stem 24 and the stem passage 102. An outer packing cartridge 120 is disposed within an enlarged portion of the stem passage 102 and maintains a fluid tight seal between the stem 24 and the wall structure defining the passage 102. A snap ring 122 is fitted within an internal groove 124 in the base portion 34 and retains the outer packing cartridge 120 within the enlarged portion of the stem passage. The outer packing cartridge 120 cooperates with the annular retainer member 118 to define an annular fluid collection chamber 126 which is in communication with the atmosphere or external operator environment through a drain passage 128. In the event fluid leaks past either of the packing cartridges 116 or 120, the leaked fluid will be vented to the atmosphere by the collection chamber 126 and the drain passage 128. This prevents fluid leaking from either the valve or the operator from causing damage to the valve or operator structure or contamination of the fluid within the valve or the operator.

In operation, assuming that the operator and valve structures are in the position illustrated in FIGURES 1 and 2, to cause opening of the valve, fluid is introduced into the second operator chamber through the fluid conduit 90 and the fluid passages 92 and 96. This causes the piston 66 to be forced to the opposite extremity of its travel, thereby forcing fluid within the first fluid chamber through the fluid passage 94 and the conduit 88 outwardly of the cylinder 54. Movement of the piston 66 in this direction causes the retainer member 76 to move in the same direction, thereby further compressing the fail-safe spring 82. The port 20 of the gate member 18 will move into aligned relationship with the flow passages 14, thereby allowing the flow of fluid through the valve 10. Movement of the gate member 18 from the open position back to the closed position illustrated in FIGURES 1 and 2 may be accomplished by either of two ways, i.e., by fluid control or under control of the fail-safe spring. Fluid may be forced through the conduit 88 and the fluid passage 94 into the first fluid chamber of the operator, thereby forcing the piston 66 from its open position to the closed position illustrated in FIGURES 1 and 2. At the same time, fluid is forced outwardly of the second chamber through the fluid passages 96 and 92 and the conduits 90. Secondly, movement of the piston 66 and the stem 24 from the open position of the valve 10 to the closed position illustrated in FIGURE 1 may also be accomplished either selectively or automatically by the spring 82. For selectively moving the piston and stem, suitable valve structure controlling the flow of fluid through the conduits 88 and 90 may be controlled, thereby allowing the free flow of fluid into the first fluid chamber and allowing the spring 82 to cause the piston to force fluid from the second fluid chamber through the conduit 90. Spring return of the valve structure to its closed position is quite satisfactory if the length of the power operator control lines 88 and 90 is not excessive. The line friction caused by excessively long hydraulic conduits may cause the operator structure to be slow to return to its safe position. In the event the power operator structure becomes inoperative either by severing of the hydraulic conduit 90 or by damage or inoperativeness of the equipment providing the hydraulic pressurized fluid, the fail-safe spring 82 will automatically move the piston 66 and the stem 64 to the safe position illustrated in FIGURES 1 and 2 forcing the hydraulic fluid from the second chamber through the passages 96 and 92 and the conduit 90.

In view of the foregoing, it is apparent that all of the objects of the invention set forth above are accomplished by the structure presented herein. Since the bonnet and base structure of the combined valve and operator is integrally formed and is of simple design, lower costs and ease of manufacture are effectively promoted. The simple reliable connection structure between the housing member and the base of the operator construction is quite simple in structure and reliable in use to the novel design thereof. This connection is also fluid tight, thereby adapting the operator construction for use in submerged conditions and in corrosive atmospheres. The novel combination stem stop and seal structure provides a positive metal to metal seal in the closed position of the valve as illustrated in FIGURE 2 and provides an adequate stop for the stem, thereby allowing the gate construction 18 to remain in a freely movable condition within the valve body. The piston on the operator construction is positively locked to the valve stem and yet is easily removable therefrom in the event servicing is desired.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A fail-safe hydraulically controlled valve comprising a valve body having a valve chamber formed therein and having inlet and outlet passages in communication with the valve chamber, means for connecting the valve body to a fluid carrying conduit, seat means in the valve body surrounding the inlet and outlet passages, a gate member disposed within the valve body and being movable between a position allowing the flow of fluid through the inlet and outlet passages and a position blocking said passages, a bonnet member retained on said valve body and forming a closure for said valve chamber, a stem passage formed in said bonnet, a valve stem extending through said stem passage and being connected at one extremity thereof to said gate member, a hydraulic cylinder fixed at one extremity thereof in sealed relation with said bonnet, the other extremity of said cylinder being closed and having a central stem opening, said valve stem extending in sealed relation through said stem opening, an internal restriction formed within said stem passage, a soft metal seal member in abutment with said restriction, said stem having stop means thereon adapted to engage said metal seal member thereby forming a stop to prevent excessive stem travel and forming a pressure actuated seal at one position of said stem to prevent the leakage of fluid from said valve chamber along said stem, a packing assembly in said stem passage disposed about said stem above said internal restriction, a piston disposed within said cylinder and dividing said cylinder into first and second fluid chambers, said piston being fixed to said valve stem, means forming a first fluid passage through said bonnet member and cylinder and opening into said second fluid chamber of said cylinder to permit the furnishing of hydraulic fluid under pressure to one side of the piston, means forming a second fluid passage through said bonnet and opening into said first fluid chamber to permit the furnishing of fluid pressure to the other side of the piston, a spring retainer carried by said valve stem exteriorly of said cylinder, a compression spring of sufficient magnitude for imparting movement to said gate surrounding said cylinder and being interposed between said spring retainer and said bonnet.

2. A fail-safe hydraulically controlled valve as set forth in claim 1, said retainer plate being of larger diameter than the diameter of said cylinder, said spring being a helical compression spring and engaging said plate adjacent the outer periphery thereof.

3. A fail-safe hydraulically controlled valve as set forth in claim 1, said stem having threads on the portion thereof disposed within said cylinder, said piston being threaded onto said stem in sealing relation therewith, a lock member received on said stem threads and locking said piston relative to said stem, means preventing rotation of said lock member relative to said piston.

4. A fail-safe hydraulically controlled valve, as set forth in claim 1, said packing assembly comprising a packing cartridge disposed in engagement with said stem passage restriction and forming a seal with the stem, a retainer ring in said stem passage maintaining the packing cartridge in engagement with said restriction.

5. A fail-safe hydraulically controlled valve, as set forth in claim 4, including means within said stem passage defining an annular drain space about said stem, a drain passage formed in said bonnet communicating said annular drain space with the medium in which the valve is disposed, a seal gland disposed within said stem passage immediately above said annular drain space, means retaining the seal gland within said stem passage.

6. A hydraulic operator comprising a base, a hydraulic cylinder having one extremity thereof fixed to said base in sealing relation therewith, a stem passage formed in said base, an operator stem extending through said stem passage into said cylinder, a closure for the other extremity of said cylinder, said stem extending through said closure in sealing relation therewith, a spring retainer carried by the stem exteriorly of the cylinder, said retainer having a larger diameter than the diameter of said cylinder, a compression spring surrounding said cylinder and being interposed between said retainer and said base and maintaining said stem under a directional bias, a piston disposed within the cylinder and dividing the cylinder into first and second fluid chambers, said piston being fixed to said stem, means for introducing fluid under pressure into and controlling the flow of fluid from said first and second fluid chambers for controlling movement of said piston, an internal shoulder defined in said stem passage, means defining a stem stop for limiting the travel of said stem in one direction, inner and outer packing means retained within said stem passage in sealing engagement with said stem and defining an annular fluid collection space therebetween, means between said inner and outer packing means communicating said annular fluid collection space with the atmosphere to vent fluid to the atmosphere should leakage occur at either of said packing means.

7. A hydraulic operator as set forth in claim 6, an internal shoulder formed in said stem passage, a soft metal ring disposed about said stem and in engagement with said shoulder, an annular enlargement formed on said stem and engaging said soft metal ring to limit one extremity of stem travel.

8. A hydraulic operator as set forth in claim 7, said soft metal ring formed with a frusto-conical surface, said enlargement having a frusto-conical surface mating with said frusto-conical ring surface to form a pressure actuated fluid tight seal.

9. A hydraulic operator as set forth in claim 8, a protective housing enclosing said cylinder and spring and being disposed in sealing engagement with said base, means preventing relative movement between the housing and said base.

References Cited
UNITED STATES PATENTS 2,974,677    3/1961    Natho _____ 251—327 X
3,244,399    4/1966    Jones et al. _____ 251—327

M. CARY NELSON, *Primary Examiner.*